(12) United States Patent
Feth et al.

(10) Patent No.: US 12,504,121 B2
(45) Date of Patent: Dec. 23, 2025

(54) SAFETY SYSTEM AND METHOD USING A SAFETY SYSTEM (71) Applicant: SICK AG, Waldkirch (DE)

(72) Inventors: Hagen Feth, Waldkirch (DE); Andreas Sixt, Waldkirch (DE); Angelina Müller, Waldkirch (DE); Holger Waibel, Waldkirch (DE)

(73) Assignee: SICK AG, Waldkirch (DE)

( * ) Notice: Subject to any disclaimer, the term of this patent is extended or adjusted under 35 U.S.C. 154(b) by 121 days.

(21) Appl. No.: 18/508,537

(22) Filed: Nov. 14, 2023

(65) Prior Publication Data

US 2024/0159355 A1 May 16, 2024

(30) Foreign Application Priority Data

Nov. 15, 2022 (DE) .......................... 102022130166.4

(51) Int. Cl.
*F16P 3/14* (2006.01)
*G01S 13/02* (2006.01)
(Continued)

(52) U.S. Cl.
CPC ............... *F16P 3/147* (2013.01); *F16P 3/144* (2013.01); *G01S 13/0209* (2013.01);
(Continued)

(58) Field of Classification Search
CPC ........ A43B 3/34; A43B 5/00; G06Q 30/0261; G06Q 30/0631; G06Q 30/0639; G08B 1/08; G08B 21/22; G16Y 20/10; G16Y 40/10; G16Y 10/65; H04Q 2209/47; H04Q 2209/84; H04Q 9/00
See application file for complete search history.

(56) References Cited

U.S. PATENT DOCUMENTS

2020/0011656 A1* 1/2020 Hornung ................. G01S 17/88
2020/0290205 A1* 9/2020 Hammes ................ B25J 9/1674
(Continued)

FOREIGN PATENT DOCUMENTS

DE 4340756 A1 6/1994
DE 102019114854 A1 12/2020
(Continued)

*Primary Examiner* — Sisay Yacob
(74) *Attorney, Agent, or Firm* — Nath, Goldberg & Meyer; Jerald L. Meyer (57) ABSTRACT A method using a safety system for localizing a person and/or object in a monitored zone having a control and evaluation unit, having at least one radio location system for the position determination of the person and/or object in the monitored zone, wherein the control and evaluation unit is configured to evaluate position data of the radio location system and status information of a spatially resolving sensor and, if a person and/or object is/are determined in the monitored zone by the radio location system, the control and evaluation unit is configured to set the spatially resolving sensor into operation at a non-reduced safety level and, if no person and/or no object is/are determined in the monitored zone by the radio location system, the control and evaluation unit is configured to set the spatially resolving sensor into operation at a reduced safety level.

18 Claims, 1 Drawing Sheet (51) Int. Cl.
   G01S 13/04     (2006.01)
   G01S 13/10     (2006.01)
   G01S 13/86     (2006.01)
   G05B 19/406    (2006.01)
   *G01S 13/42*       (2006.01)
   *G01S 13/931*      (2020.01)

(52) U.S. Cl.
   CPC .............. *G01S 13/04* (2013.01); *G01S 13/10* (2013.01); *G01S 13/865* (2013.01); *G05B 19/406* (2013.01); *F16P 3/142* (2013.01); *G01S 13/42* (2013.01); *G01S 13/862* (2013.01); *G01S 2013/93185* (2020.01); *G01S 2013/9329* (2020.01)

(56)            References Cited

U.S. PATENT DOCUMENTS

2021/0156951 A1*  5/2021  Brunner ................ G01S 17/894
2021/0348718 A1* 11/2021  Brunner ................ F16P 3/147

FOREIGN PATENT DOCUMENTS

| DE | 102019131833 A1 | 5/2021 |
| DE | 102020114488 B3 | 12/2021 |
| DE | 202020107300 U1 | 3/2022 |
| DE | 102021101180 A1 | 7/2022 |

* cited by examiner

SAFETY SYSTEM AND METHOD USING A SAFETY SYSTEM

FIELD

The present invention relates to a safety system for localizing a person and to a method of localizing a person.

BACKGROUND

Safety systems used in safety engineering have to work particularly reliably and intrinsically safely and must therefore satisfy high safety demands, for example the standard EN13849 for safety of machinery and the machinery standard EN1496 for electrosensitive protective equipment (ESPE).

A required safety level is practically only defined once for a machine in an industrial plant. The definition takes place while the machine is being developed or thereafter if it is subsequently equipped with safety technology. The validation, that is the inspection and approval of the safety and the safety level, also only takes place once, namely as part of the putting into operation. This is rigid and inflexible.

Safety sensors have previously typically been developed and licensed for one to two specified safety levels. A light grid is e.g. certified for type 2 and type 4, a laser scanner for type 3 (types 2 to 4, for example, in accordance with IEC/EN 61496-2). Which safety level the respective sensor has is fixedly specified by the manufacturer.

The higher the safety level according to which the sensor is to be licensed, the higher the demands on the diagnostic coverage, redundancies, and documentation during the development process, and competencies of the developers with respect to functional safety.

ISO EN 13849-1, that defines the performance level in a similar manner to the safety level, was shaped in this environment. ISO EN 13849-1 takes account of the machine directive and observes safety functions in both a qualitative and quantitative manner.

A minimal reflectivity of objects that an optical safety sensor still has to be able to detect within its monitored zone is, for example, also dependent on the safety level. The higher the safety level, the smaller the minimal reflectivity of the objects that have to be safely detected. I.e. the tests on an optoelectronic sensor relevant to the certification that should satisfy PL d are carried out using test specimens that have a different reflectivity than a sensor with PL b.

DE102019131833 A1 discloses a method of checking the setting of predefined safety functions of a field instrument of process and automation technology. This includes the defining of a safety level required at the measurement site and/or at the field instrument, with the fixed safety level defining the desired setting of the specified safety functions of the field instrument. As a rule, there are a plurality of safety levels that each define a desired setting of the specified safety functions. The safety levels apply to all the field instruments. After the configuration of the field instrument, a safety level suitable for the field instrument and/or for the measurement site can be selected and can be checked and adapted by means of the method.

Safety sensors are typically operated at the highest available safety level. I.e. the safety sensors typically restrict the operating routines much more than the current hazard situation would require. The interpretation of the required safety level takes place on the basis of the statistical worst case. This means that it is sufficient for the assumption if the worst case can occur at any point in the product cycle, optionally weighted by its likelihood of occurrence.

SUMMARY

It is an object of the invention to provide a safety system having a safety sensor, wherein the safety sensor can have different safety levels. The productivity in an industrial plant should be increased. At the same time, the safety level required at the current point in time should not be fallen below.

The object is satisfied by a safety system for localizing a person and/or object in a monitored zone having a control and evaluation unit, having at least one radio location system for the position determination of the person and/or object in the monitored zone, having at least one spatially resolving sensor for the presence determination of the person and/or object in a protected field of the spatially resolving sensor, wherein the protected field is arranged within the monitored zone, wherein the radio location system as arranged radio stations, wherein at least one radio transponder is arranged at the person and/or object, wherein position data of the person and/or object can be determined by means of the radio location system, wherein the position data can be transmitted from the radio stations of the radio location system to the control and evaluation unit and status information on the protected field can be determined by means of the spatially resolving sensor, wherein status information on the protected field can be transmitted from the spatially resolving sensor to the control and evaluation unit, wherein the control and evaluation unit is configured to evaluate the position data of the radio location system and the status information of the spatially resolving sensor and, if a person and/or object is/are determined in the monitored zone by the radio location system, the control and evaluation unit is configured to set the spatially resolving sensor into operation at a non-reduced safety level and, if no person and/or no object is/are determined in the monitored zone by the radio location system, the control and evaluation unit is configured to set the spatially resolving sensor into operation at a reduced safety level.

The object is further satisfied by a method using a safety system for localizing a person and/or object in a monitored zone having a control and evaluation unit, having at least one radio location system for the position determination of the person and/or object in the monitored zone, having at least one spatially resolving sensor for the presence determination of the person and/or object in a protected field of the spatially resolving sensor, wherein the protected field is arranged within the monitored zone, wherein the radio location system has arranged radio stations, wherein at least one radio transponder is arranged at the person and/or object, wherein position data of the person and/or of the object are determined by means of the radio location system, wherein the position data are transmitted from the radio stations of the radio location system to the control and evaluation unit and status information on the protected field are determined by means of the spatially resolving sensor, wherein status information on the protected field are transmitted from the spatially resolving sensor to the control and evaluation unit, wherein the control and evaluation unit evaluates the position data of the radio location system and the status information of the spatially resolving sensor and, if a person and/or object is/are determined in the monitored zone by the radio location system, the control and evaluation unit sets the spatially resolving sensor into operation at a non-reduced safety level and, if no person and/or no object is/are determined in the monitored zone by the radio location system, the control and evaluation unit sets the spatially resolving sensor into operation at a reduced safety level.

The solution in accordance with the invention starts from the fact that in a production plant or a logistics center, a radio location system or safe localization system has been additionally installed beside the locally attached spatially resolving sensors or safety sensors that determines the positions of the persons, objects, or mobile machines present with an accuracy of around one meter or more exactly. For this purpose, all the persons, objects, and/or, for example, mobile machines are provided with at least one radio transponder.

If, in accordance with the invention, the safety level of the sensor is temporarily reduced locally, the productivity is increased.

The term "functionally safe" is to be understood in the sense of the standards named or of comparable standards; measures are therefore taken to control faults up to a specified safety level. The safety system can therefore be configured as intrinsically safe. The safety system and/or at least the safe sensor moreover generates/generate unsafe data such as raw data, point clouds, or the like. Unsafe is the opposite of safe for unsafe devices, transmission paths, evaluations, and the like and accordingly said demands on fail safeness are not satisfied.

A safety level or also a performance level (PL value) is determined in accordance with IEC/EN 13849. The classification of the PL value ranges from a (low contribution to risk reduction) to e (high contribution to risk reduction). Unlike the technical demands of the standard EN 954-1, the standard ISO 13849 allows a plurality of ways to achieve a required PL value. The user can therefore combine suitable measures that come closest to his ideas. Technical conditions or cost aspects can play a role here. Defined safety structures still have to be used.

IEC/EN 13849-1 takes account of the machine directive and observes safety functions in both a qualitative and quantitative manner. It defines five technical safety performance levels (PL a, b, c, d, e), that stand for average probability values of a hazardous failure per hour) for classifying different technical safety performance. EN ISO 13849-1 specifies an iterative process for designing and validating safety-related parts of control systems (SRP/CS).

Machinery or plant have to meet certain demands so that their control systems can work safely. Four characteristics are of prime importance here that play a particularly important role in evaluating electrical or electronic safety systems.

The architecture and structure of the system is a characteristic of the safety system. Safety systems can be of a single-channel, two channel, or multichannel design. Whereas single-channel systems as a rule respond to faults with a failure, two-channel or multichannel system can check one another and can recognize possible faults. The measure for the architecture is the HFT (hardware fault tolerance) value. If the HFT value is 0, no hardware fault tolerance is present and any fault can result in a failure. A two-channel design is better than a single-channel design, for example.

Diagnostic coverage is a characteristic of the safety system. Both single-channel and two-channel (or even multichannel structures can fail. If the function of the structure is tested regularly, however, a failure or a defect can be recognized. The diagnostic coverage (DC) indicates the probability at which the faults will be revealed by a test. Safety systems have to be tested so that it is demonstrated whether they still work. The diagnostic coverage here depends on the quality of the test.

A failure rate is a characteristic of the safety system. If the failure rate is small, practically no defects need to be feared. If the failure rate for a sensor is equal to ZERO, for example, it will theoretically never fail and it will always show the correct sensor result. Since this does not correspond to practice, a further instrument or a test is required. The lower the failure rate of safety units, the less it has to be feared that a failure will result in a malfunction of the safety function. The failure rate indicates the number of failures per time unit. As a rule, a scale of 1 failure every $10^9$ hours is selected (this is an extremely small unit since only one failure every approximately 100,000 years corresponds thereto; this value is also called 1 fit, failure in time.

A common cause failure is a characteristic of the safety system. Parameters are meant here that have a simultaneous effect on a plurality of systems. A single cause thus has a fatal effect on all the instruments. Even if systems have two or even more channels and these are even tested and additionally also only rarely fail, a single negative influence can nevertheless influence or even shut down all the systems. In electronics in this respect, for example, extreme voltage levels are known that can simultaneously make a plurality of units abruptly unusable. These common cause failures (CCFs) always have to be avoided.

The safe radio location system determines and tracks the whereabouts of all the persons or objects in the monitored zone. It, for example, causes all the spatially resolving sensors that are located in the closer proximity of persons or objects to adopt a higher safety level. Spatially resolving sensors that are not located in the closer environment of persons or objects are, for example, caused to adopt a lower safety level.

The signals to change the safety level are sent, for example, from the safe radio location system of the control and evaluation unit to the spatially resolving sensors. The spatially resolving sensor has, for example, a safe input or a safe input interface.

The radio stations serve the radio-based communication and the time of flight measurement with the radio transponders having varying locations and the forwarding of a communication and time of flight measured values to the control and evaluation unit or to the RTLS server.

The control and evaluation unit or a central RTLS server receives the measured time of flight signals and determines position values of the radio transponders present therefrom.

The localization of the radio transponders takes place by time of flight measurements of radio signals that are cyclically swapped between the radio transponders and a plurality of fixed position radio stations. This works very well when the signals are transmitted at a sufficient signal strength and on a straight or direct propagation path.

The signals of a radio transponder are received by a plurality of fixed position radio stations or anchor stations and the basis for the localization is created via a time of flight measurement, e.g. the time of arrival (TOA) or e.g. the time difference of arrival (TDOA). The calculation or estimation of the position of a radio transponder then takes place on the control and evaluation unit, for example an RTLS (real time location system) server that is connected to all the radio stations or anchor stations via a wireless or wired data link. This mode of localization is called an RTLS (real time location system) mode.

The spatially resolving sensor can, for example, be arranged at a fixed location. Provision is, however, also made that the spatially resolving sensor has a variable position, that is, is arranged as mobile. The spatially resolving sensor is, for example, arranged at a vehicle, in particular at an autonomous vehicle. The radio transponders are, for example, likewise arranged at a fixed position or a variable position. The spatially resolving sensor is, for example, configured for the at least planar monitoring of a protected field or protected zone.

The spatially resolving sensor for the at least planar monitoring of a protected zone is a sensor for distance measurement. The distance sensor delivers distance values in at least two-dimensional space. In so doing, the sensor outputs measured values with distance indications and angle indications. For example, the distance is determined by means of time of flight methods or triangulation methods.

The spatially resolving sensor is optionally an optoelectronic sensor.

With an optoelectronic sensor, for example a time of flight sensor, the light that is transmitted by a light transmitter and that is remitted by the person or object is received by a light receiver and the time of flight from the transmission from the person or object is evaluated, whereby the distance from the person or object can be determined. This is a localization, namely, for example, the determination of distance and angle.

The switching over of the different safety levels can take place by an operating mode switchover. On an operating mode switchover from the calculation with, for example, a high remission to a low remission, an autonomous vehicle would, where applicable, brake abruptly until it is slow enough for the shorter protected field. This problem can be solved in that the switchover takes place at so early a time that the autonomous vehicle has sufficient time to brake slowly.

The safety level of the sensor can also be downgraded so much that a safety level is no longer present. The sensor is then no longer part of the safety system or of the safety architecture. The sensor can thus, for example, still be used to avoid collisions between objects.

In normal operation, the control and evaluation unit transmits a signal to the local spatially resolving sensor when it should change into the lower safety level. For example, a kind of operating mode switchover using a 1 of 2 input, in the simplest case a 1 of 2 input at the spatially resolving sensor.

Alternatively, the local spatially resolving sensor could receive a digital signal that causes the spatially resolving sensor to change to the low safety level for a predetermined time.

The safety level is not reduced in the following cases, for example:

If communication between the radio transponders and the radio stations is defective or if the radio location system cannot deliver any reliable data.

If it cannot be ensured that all the persons or objects located close to a machine bear a radio transponder. For example, an operator of a truck that delivers material that is to be unloaded by autonomous vehicles. For example, there is a defect in a lock that should ensure that only persons having a valid radio transponder may dwell in the monitored zone.

On a provided close human-machine interaction. For example, there is a person close to a machine and the machine should nevertheless not be stopped. Provision is made here, for example, that the spatially resolving sensor has a better response time and/or a better spatially resolving than the radio location system. A light grid can, for example, recognize an intrusion of a human finger while the radio location system can only recognize the position of the person's body.

The control and evaluation unit, for example, transmits a signal to the spatially resolving sensors in these cases to operate them at the highest available safety level.

The safety level is reduced in the following cases, for example:

Communication between the radio transponder and the radio station works sufficiently well to ensure the response time required for the current situation. And the radio location system delivers reliable data according to which, for example, a program routine of the radio location system is not decisively disrupted.

All the persons wear radio transponders. There is no person without a radio transponder. It can be ensured that all the persons or moving objects that are close to a machine or are within the monitored zone bear a working radio transponder. Persons and/or objects can admittedly be in the monitored zone that admittedly themselves do not bear a radio transponder, but whose position is, for example, known in another manner; for example because a person is operating a fork lift that is equipped with a working radio transponder that is thus also automatically associated with the person in the fork lift. If collisions between autonomous vehicles and static or fixed position objects are likewise to be prevented, all the static objects must also be entered in a map of the radio location system, for example.

For example, the safety of persons that do not bear a radio transponder can be ensured since they do not have access to the monitored zone since, for example, an access zone with an access lock is provided that only permits access to persons having a radio transponder.

In a further development of the invention, a control and evaluation unit of the spatially resolving sensor is configured in operation with a reduced safety level to carry out extraneous light tests with a lower quality due to lower demands with respect to an extraneous light resistance.

At a reduced safety level, for example, some demands with respect to an extraneous light resistance could be dispensed with. Extraneous light tests could, for example, be dispensed with or at least carried out, but they do not necessarily result in an error message or not necessarily in a reduction of the sensor function.

A warning is, for example, only output that extraneous light may have been detected. Higher productivity is thereby given since there are fewer downtimes.

In a further development of the invention, a control and evaluation unit of the spatially resolving sensor is configured on operation at a reduced safety level only to output a warning from the control and evaluation unit if contamination of the front screen of the spatially resolving sensor has been detected, but switch outputs of the spatially resolving sensor remain active.

For example, a threshold for the contamination warning is displaced, for example. This has the consequence that the sensor remains in proper normal operation longer. In the ideal case, for example, the front screen is cleaned before the spatially resolving sensor has to switch its switch outputs because the received luminous intensity is lower than a permitted comparison threshold. There are thus, for example, fewer failures due to a contaminated front screen. This is particularly interesting if the spatially resolving sensor is operated in a dusty environment (e.g. in wood processing). Higher productivity thereby results.

In a further development of the invention, a control and evaluation unit of the spatially resolving sensor is configured in operation at a reduced safety level to carry out fewer fault control measures.

Fewer faults have to be controlled at a reduced safety level. Fewer failures therefore also have to be accumulated in a fault mode and effects analysis (FMEA). Lower diagnosis coverage is thereby possible. Self-tests of the spatially resolving sensor thereby have to be carried out less often or, partially in ongoing operation, not at all. Fewer false alarms and thereby higher productivity thereby result.

In a further development of the invention, a control and evaluation unit of the spatially resolving sensor is configured in operation at a reduced safety level to carry out fewer or no multiple evaluations.

At a reduced safety level, for example, multiple evaluations are no longer necessary or fewer multiple evaluations are acceptable. This leads to a shorter response time, whereby, for example, a high maximum max. travel speed is made possible, which in turn leads to higher productivity.

At a reduced safety level, fewer demands have to be made on an MTTFd (=mean time to dangerous failure). A performance level of PL d, for example, requires a high level, namely 30 years MTTFd 100 years. A performance level of PL b, for example, requires a middle level, namely 10 years MTTFd 30 years.

The information transfer from the radio location system or from the control and evaluation unit to the local spatially resolving safety sensors can be carried out in various manners.

By a cable or a line, for example, typically with a translation to a suitable safe interface such as Ethernet, ID link safety, or a 1 of N signal.

The information transfer can, for example, take place wirelessly directly to the local spatially resolving safety sensor, for example by Bluetooth, Bluetooth low energy, etc.

The information transfer can, for example, take place via the radio transponder to the object and then from there by cable or wirelessly to the spatially resolving sensor.

In a further development of the invention, a first inspection unit is provided, with the first inspection unit being connected to the control and evaluation unit, with the control and evaluation unit being inspected by the first inspection unit.

The first inspection unit or a safe RTLS watchdog controller monitors the control and evaluation unit, with the first inspection unit, for example, validating the determined position data, transmitting switchover signals for a safety status of the individual radio transponders, or initiates inspection unit reset signals to the radio transponders in dependence on the situation, for example.

The first inspection unit and the control and evaluation unit thus form at least one single-channel system with testing in accordance with ISO 13849 or, optionally, a two-channel system. The first inspection unit provides the required diagnostic measures such as are required, for example, by the relevant safety standards.

The first inspection unit or an RTLS watchdog controller serves the monitoring and diagnosis of the safety system and of the control and evaluation unit and performs safety functions of the safety system. The first inspection unit uses the control and evaluation unit as a communication relay, for example. The first inspection unit, for example, specifically monitors the correct communication between the radio transponders, the radio stations, and the control and evaluation unit, checks the time behavior of all the components, and performs consistency checks on the data determined. The first inspection unit optionally also uses a functional block for this purpose that is performed in the control and evaluation unit or on the RTLS server.

The first inspection unit or the RTLS watchdog controller uses position data or checked position data of the RTLS system and, for example, information on hazard locations provided in advance by configuration, details of the operating environment, etc. to carry out an evaluation of the local hazards. This is done in the simplest case in that the distances between persons and hazard locations are determined and in that risk reducing measures are initiated on a falling below of s safety limit. A risk reduction is based, for example, on the inspection unit transmitting a safe shutdown or switchover signal to the radio transponders that they, for example, forward to a connected machine or, in the case of a radio transponder, forward a warning signal or action instructions to the person.

A plurality of radio transponders are provided, for example, to all machines and persons of varying locations and optionally also to stationary machines, for example.

The radio transponders can have additional tasks and therefore differ from the conventional radio transponders or tags. The following functions are included, for example, in addition to the support of the localization function of the RTLS system:

Radio-based determination of one's own position; for example, an inverse radio location based on flashing light signals of the different radio stations.

Alternatively, a time of flight measurement of the radio station signals can take place by the radio transponder and a feedback of the time of flight differences to the first inspection unit or to the RTLS watchdog controller, according to which a validation of the calculated radio transponder positions optionally takes place.

A transmission of position/status/diagnostic information for example, further takes place to the control and evaluation unit and to the first inspection unit.

To be able to perform these functions, the radio transponders have directional communication, for example, with the first inspection unit.

The first inspection unit checks the plausibility of the determined position data and transmits signals to switch over a safety status of the respective radio transponder on a recognition of faults or implausible measured values.

The RTLS system according to which position data of the radio transponder, and thus position data of the objects, can be determined by means of the radio location system determines the positions of all the radio transponders in a fixed time pattern using radio location. The RTLS system works with bidirectional communication between the radio transponders and the radio stations. This is because the radio transponders can additionally determine their positions themselves and transmit the result of the localization to the control and evaluation unit with the aid of a radio feedback channel, for example a UWB feedback channel. Two independently determined pieces of position information are thereby available for comparison in the control and evaluation unit or in the RTLS server. Namely, first, the position information determined by the radio stations and, second, the position information determined by the radio transponders. Alternatively, time of flight measurements of the signals transmitted by the radio stations can be carried out by the radio transponders and only the determined times of flight can be returned to the control and evaluation unit for validation. This is sufficient for the validation of the position determination. The bidirectional communication can additionally be used to forward diagnostic information or other status information locally determined on the transponders to the first inspection unit or to the watchdog controller.

In a further development of the invention, the radio location system is an ultra wideband radio location system, with the frequency used being in the range from 3.1 GHz to 10.6 GHz, with the transmission energy per radio station amounting to a maximum of 0.5 mW.

An absolute bandwidth in an ultra wideband radio location system amounts to at least 500 MHz or a relative bandwidth amounts to at least 20% of the central frequency.

The range of such a radio location system amounts, for example, to 0 to 50 m. In this respect, the short time duration of the radio pulses is used for the localization.

The radio location system thus only transmits radio waves at a low energy.

A different radio technology could also be used for localization in addition to said UWB localization system.

The connection of the localization and communication function in the UWB system could also be divided over two separate systems. Provision is, for example, made that the UWB system only takes over the localization and an additional wireless LAN network is used for the data transfer.

In a further development of the invention, the spatially resolving sensor is an ultrasound sensor or a radar sensor.

An ultrasound sensor transmits ultrasound and evaluates the reflected sound waves, that is the echo signals. Frequencies from 16 kHz onward are used here. Detection ranges from a few centimeters to a number of meters can be implemented here.

A radar sensor is a sensor that transmits a so-called primary signal as a bundled electromagnetic wave that receives echoes reflected from persons or objects as a secondary signal and evaluates it according to different criteria. This is a localization, namely, for example, the determination of distance and angle.

Position information or the position can be acquired from the received waves reflected from the person or object. As already mentioned, the angle or the direction toward the object and the distance from the person or object can be determined from the time shift between the transmission and reception of the signal. The relative movement between the transmitter and the person or object can furthermore also be determined, for example by a simple multiple measurement at time intervals. The arrangement of individual measurements after one another delivers the distance and the absolute speed of the object. Contours of the person or object can be recognized with a corresponding resolution of the radar sensor.

Irradiation from the radar sensor takes place, for example, largely bundled in one direction due to the antenna design. The radiation characteristics of the antenna then has a so-called lobe shape.

The wavelength of the radar is in the range of the radio waves in the short wave to microwave range. A pulse radar sensor transmits pulses having a typical duration in the lower microsecond range and then waits for echoes. The transit time of the pulse is the time between the transmission and the reception of the echoes. It is used for the distance determination.

A direction of the scanning beam of a pulse radar sensor can also be effected, instead of by the alignment of the antenna or antennas, electronically by phase-controlled antenna arrays. A plurality of objects can be targeted and almost simultaneously tracked in a fast alternating manner by this.

The radar sensor works at a power of approximately 10 mW, for example. This power is so low that there are no health effects. The radar frequency licensed for this application is, for example, in the range from 76-77 GHz, corresponding to a wavelength of approximately 4 mm.

In a further development of the invention, the spatially resolving sensor is configured for the at least spatial monitoring of a monitored zone.

In a further development of the invention, the optoelectronic sensor is a laser scanner, a safety laser scanner, a 3D camera, a stereo camera, or a time of flight camera.

The spatially resolving scanner, the laser scanner, the safety laser scanner, the 3D camera, the stereo camera, or the time of flight camera monitors a two-dimensional or a three-dimensional protected field or a measurement data contour for the position detection. It can synonymously be a monitored field.

If e.g. a solid state laser scanner of a type d performance level is downgraded to a type c performance level or a type b performance level, a higher minimal remission of the objects can be assumed in the safety calculation.

This means that the objects to be detected have to be assumed as less black. For example, a test bar in the inspection and approval. More light arrives at the receiver since the object reflects and scatters back more light. There is thus a higher received energy at the same distance or the same little received energy at a greater distance.

A greater safe range and thus a larger protected field thus results. An autonomous vehicle thereby, for example, has a wider field of view, whereby a higher maximum travel speed is possible and thereby higher productivity.

A 3D camera, for example, likewise monitors a protected zone by means of a plurality of detected distance values. A 3D camera has the advantage that a volume-like protected zone can be monitored.

A stereo camera, for example, likewise monitors a protected zone or a protected field by means of a plurality of detected distance values. The distance values are determined on the basis of the two cameras of the stereo camera that are installed at a base spacing from one another. A stereo camera equally has the advantage that a volume-like protected zone can be monitored.

Distance values on the basis of the measured time of flight that are determined by an image sensor are determined by means of a time of flight camera. A time of flight camera equally has the advantage that a volume-like or spatial protected zone can be monitored.

In a further development of the invention, a control and evaluation unit of the spatially resolving sensor is configured in operation at a reduced safety level to carry out an evaluation on the basis of a higher minimal remission of the object.

A higher minimal remission from the objects may be assumed. A higher safe maximum range of the sensor follows on from this. A larger protected field can thus be implemented. An autonomous vehicle can thus, for example, be implemented with a larger protected field. The autonomous vehicle can thus drive foster, which in turn results in higher productivity.

A received energy is quadratic depending on the distance from the object. With reflected light, the light distance is "doubled" since the light is radiated from the transmitted to the object and then back to the receiver. Remission can also be called a "detectable degree of remission" or in the vernacular reflectivity.

In a further development of the invention, the spatially resolving sensor is a light grid. A light grid preferably has a light grid transmitter in a first housing and a light grid receiver in a second housing. A protected field is formed between the light grid transmitter and the light grid receiver.

In a further development of the invention, a control and evaluation unit of the light grid is configured in operation at a reduced safety level to carry out an evaluation on the basis of a larger opening angle of light receivers of the light grid.

Greater opening angles are permitted at a reduced safety level with a light grid. For example, with a light grid +/−5° at 3 m distance between the transmitter and the receiver in comparison with +/−2.5° at a higher safety level.

The light grid is less susceptible to vibrations during operation at a larger opening angle.

At a reduced safety level, for example, a higher transmission power is also possible since fewer failures have to be assumed to observe the max. opening angles.

BRIEF DESCRIPTION OF THE DRAWINGS

The invention will also be explained in the following with respect to further advantages and features with reference to the enclosed drawing and embodiments. The FIGURE of the drawing shows in.

DETAILED DESCRIPTION

Figure 1:
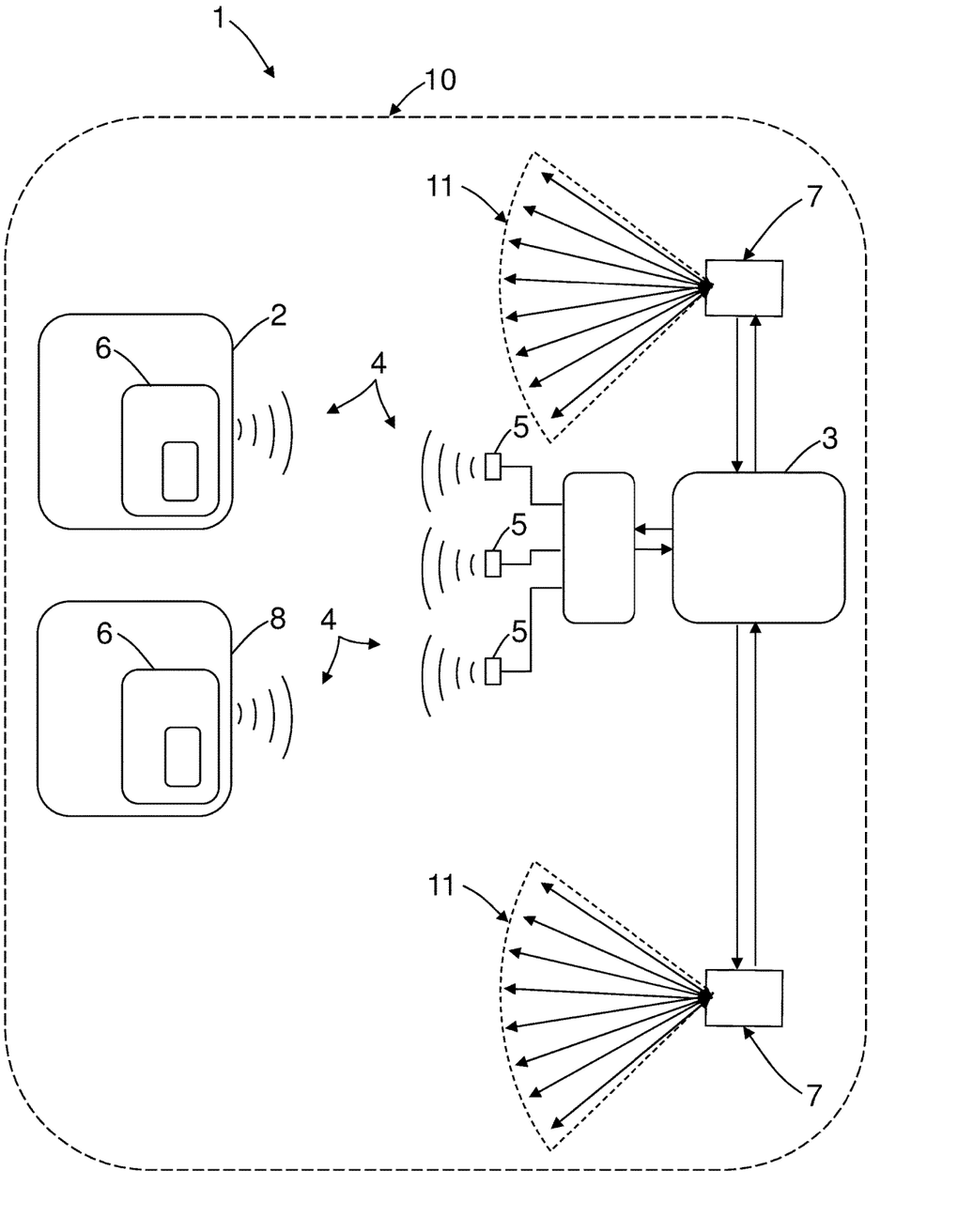
FIG. 1: a safety system.

FIG. 1 shows a safety system 1 for localizing a person 2 and/or object 8 in a monitored zone 10 having a control and evaluation unit 3, having at least one radio location system 4 for the position determination of the person 2 and/or object 8 in the monitored zone 10, having at least one spatially resolving sensor 7 for the presence determination of the person 2 and/or object 8 in a protected field 11 of the spatially resolving sensor 7, wherein the protected field 11 is arranged within the monitored zone 10, wherein the radio location system 4 has arranged radio stations 5, wherein at least one radio transponder 6 is arranged at the person 2 and/or object 8, wherein position data of the person 2 and/or object 8 can be determined by means of the radio location system 4, wherein the position data can be transmitted from the radio stations 5 of the radio location system 4 to the control and evaluation unit 3 and status information on the protected field 11 can be determined by means of the spatially resolving sensor 7, wherein status information on the protected field 11 can be transmitted from the spatially resolving sensor 7 to the control and evaluation unit 3, wherein the control and evaluation unit 3 is configured to evaluate the position data of the radio location system 4 and the status information of the spatially resolving sensor 7 and, if a person 2 and/or object 8 is/are determined in the monitored zone 10 by the radio location system 4, the control and evaluation unit 3 is configured to set the spatially resolving sensor 7 into operation at a non-reduced safety level and, if no person 2 and/or no object 8 is/are determined in the monitored zone 10 by the radio location system 4, the control and evaluation unit 3 is configured to set the spatially resolving sensor 7 into operation at a reduced safety level.

The solution starts from the fact that in a production plant or a logistics center, a radio location system 5 or safe localization system has been additionally installed beside the locally attached spatially resolving sensors 7 or safety sensors that determines the positions of the persons 2, objects 8, or mobile machines with an accuracy of around one meter or more exactly. For this purpose, all the persons 2, objects 8, and/or, for example, mobile machines are provided with at least one radio transponder 6.

If the safety level of the sensor 7 is temporarily reduced, the productivity is increased.

The safe radio location system 4 determines and tracks the whereabouts of all the persons 2 or objects 8 in the monitored zone 10. It, for example, causes all the spatially resolving sensors 7 that are located in the closer proximity of persons 2 or objects 8 to adopt a higher safety level. Spatially resolving sensors 7 that are not located in the closer environment of persons 2 or objects 8 are, for example, caused to adopt a lower safety level.

The signals to change the safety level are sent, for example, from the safe radio location system 4 of the control and evaluation unit 3 to the spatially resolving sensors 7. The spatially resolving sensor 7 has, for example, a safe input or a safe input interface.

The spatially resolving sensor 7 can, for example, be arranged at a fixed location. Provision is, however, also made that the spatially resolving sensor 7 has a variable position that is arranged as mobile. The spatially resolving sensor 7 is, for example, arranged at a vehicle, in particular at an autonomous vehicle. The radio transponders are, for example, likewise arranged at a fixed position or a variable position.

The spatially resolving sensor 7 is, for example, configured for the at least planar monitoring of a protected field 11 or protected zone.

The spatially resolving sensor 7 for the at least planar monitoring of a protected zone is, for example, a sensor for distance measurement. The distance sensor delivers distance values in at least two-dimensional space. In so doing, the sensor 7 outputs measured values with distance indications and angle indications. For example, the distance is determined by means of time of flight methods or triangulation methods.

The spatially resolving sensor 7 is optionally an optoelectronic sensor.

With an optoelectronic sensor, for example a time of flight sensor, the light that is transmitted by a light transmitter and that is remitted by the person 2 or object 8 is received by a light receiver and the time of flight from the transmission from the person 2 or object 8 is evaluated, whereby the distance from the person 2 or object 8 can be determined. This is a localization, namely, for example, the determination of distance and angle.

A downgrading or reduction of the safety level of the local sensor 7 can influence the following aspects:

A higher minimal remission from the objects 8 may be assumed. A higher safe maximum range of the sensor 7 follows on from this. A larger protected field 11 can thus be implemented. An autonomous vehicle can thus be implemented with a larger protected field 11. The autonomous vehicle can thereby drive faster, which in turn results in higher productivity.

The switching over of the different safety levels can take place by an operating mode switchover.

Greater opening angles are permitted at a reduced safety level with a light grid as the sensor 7. For example, with a light grid +/−5° at 3 m distance between the transmitter and the receiver in comparison with +/−2.5° at a higher safety level. At a reduced safety level, for example, a higher transmission power is also possible since fewer faults have to be assumed to observe the max. opening angles.

In normal operation, the control and evaluation unit 3 transmits a signal to the local spatially resolving sensor 7 when it should change into the lower safety level.

Alternatively, the local spatially resolving sensor 7 could receive a digital signal that causes the spatially resolving sensor 7 to change to the low safety level for a predetermined time.

The information transfer from the radio location system 4 or from the control and evaluation unit 3 to the local spatially resolving safety sensors 7 can be carried out in various manners.

By a cable or a line, for example, typically with a translation to a suitable safe interface such as Ethernet, ID link safety, or a 1 of N signal.

The information transfer can, for example, take place wirelessly directly to the local spatially resolving safety sensor 7, for example by Bluetooth, Bluetooth low energy, etc.

The information transfer can, for example, take place via the radio transponder 6 to the object 8 and then from there by cable or wirelessly to the spatially resolving sensor 7.

Optionally, a first inspection unit is provided, with the first inspection unit being connected to the control and evaluation unit 3, with the control and evaluation unit 3 being inspected by the first inspection unit.

The first inspection unit or a safe RTLS watchdog controller monitors the control and evaluation unit 3, with the first inspection unit, for example, validating the determined position data, transmitting switchover signals for a safety status of the individual radio transponders 6, or initiating inspection unit reset signals to the radio transponders 6 in dependence on the situation, for example.

The first inspection unit and the control and evaluation unit 3 thus form at least one single-channel system with testing in accordance with ISO 13849 or, optionally, a two-channel system. The first inspection unit provides the required diagnostic measures such as are required, for example, by the relevant safety standards.

REFERENCE NUMERALS

1 safety system
2 person
3 control and evaluation unit
4 radio location system
5 radio stations
6 radio transponder
7 spatially resolving sensor
8 object
9 first inspection unit
10 monitored zone
11 protected field

The invention claimed is:

1. A safety system for localizing a person and/or an object in a monitored zone having a control and evaluation unit, having at least one radio location system for the position determination of the person and/or of the object in the monitored zone, having at least one spatially resolving sensor for the presence determination of the person and/or of the object in a protected field of the spatially resolving sensor, wherein the protected field is arranged within the monitored zone,
   wherein the radio location system has arranged radio stations,
   wherein at least one radio transponder is arranged at the person and/or the object;
   wherein position data of the person and/or the object can be determined by means of the radio location system,
   wherein the position data can be transmitted from the radio stations of the radio location system to the control and evaluation unit, and status information on the protected field can be determined by means of the spatially resolving sensor,
   wherein status information on the protected field can be transmitted from the spatially resolving sensor to the control and evaluation unit,
   wherein the control and evaluation unit is configured to evaluate the position data of the radio localization system and the status information of the spatially resolving sensor; and if a person and/or an object is/are determined in the monitored zone by the radio location system, the control and evaluation unit is configured to set the spatially resolving sensor into operation at a non-reduced safety level, and, if no person and/or no object is/are determined in the monitored zone by the radio location system, the control and evaluation unit is configured to set the spatially resolving sensor into operation at a reduced safety level,
   and wherein a control and evaluation unit of the spatially resolving sensor is configured in operation at a reduced safety level to carry out fewer fault control measures.

2. The safety system in accordance with claim 1, wherein a control and evaluation unit of the spatially resolving sensor is configured in operation at a reduced safety level to carry out extraneous light tests with a lower quality due to lower demands with respect to an extraneous light resistance.

3. The safety system in accordance with claim 1, wherein a control and evaluation unit of the spatially resolving sensor is configured in operation at a reduced safety level of the spatially resolving sensor only to output a warning from the control and evaluation unit if contamination of the front screen of the spatially resolving sensor has been detected, but switch outputs of the spatially resolving sensor remain active.

4. The safety system in accordance with claim 1, wherein a control and evaluation unit of the spatially resolving sensor is configured in operation at a reduced safety level to carry out fewer or no multiple evaluations.

5. The safety system in accordance with claim 1, wherein a first inspection unit is provided, with the first inspection unit being connected to the control and evaluation unit, and with the control and evaluation unit being checked by the first inspection unit.

6. The safety system in accordance with claim 1, wherein the radio location system is an ultra wideband radio location system, with the frequency used being in the range from 3.1 GHz to 10.6 GHz, with the transmission energy amounting to a maximum of 0.5 mW.

7. The safety system in accordance with claim 1, wherein the spatially resolving sensor is an ultrasound sensor or a radar sensor.

8. The safety system in accordance with claim 1, wherein the spatially resolving sensor is configured for an least spatial monitoring of a monitored zone.

9. A safety system in accordance with claim 1, wherein the spatially resolving sensor is a laser scanner, a safety laser scanner, a 3D camera, a stereo camera, or a time of flight camera.

10. The safety system in accordance with claim 1, wherein a control and evaluation unit of the spatially resolving sensor is configured in operation at a reduced safety level to carry out an evaluation on the basis of a higher minimal remission of the object.

11. The safety system in accordance with claim 1, wherein the spatially resolving sensor is a light grid.

12. The safety system in accordance with claim 11, wherein a control and evaluation unit of the light grid is configured in operation at a reduced safety level to carry out an evaluation on the basis of a larger opening angle of light receivers of the light grid.

13. A method using a safety system for localizing a person and/or an object in a monitored zone having a control and evaluation unit, having at least one radio location system for the position determination of the person and/or object in the monitored zone, having at least one spatially resolving sensor for the presence determination of the person and/or the object in a protected field of the spatially resolving sensor, wherein the protected field is arranged within the monitored zone,
   wherein the radio location system has arranged radio stations,
   wherein at least one radio transponder is arranged at the person and/or the object,
   wherein position data of the person and/or the object are determined by means of the radio location system,
   wherein the position data are transmitted from the radio station of the radio location system to the control and evaluation units and status information on the protected field are determined by means of the spatially resolving sensor,
   wherein status information on the protected field are transmitted from the spatially resolving sensor to the control and evaluation unit,
   wherein the control and evaluation unit evaluates the position data of the radio localization system and the status information of the spatially resolving sensor; and, if a person and/or an object is/are determined in the monitored zone by the radio location system, the control and evaluation unit sets the spatially resolving sensor into operation at a non-reduced safety level, and, if no person and/or no object is/are determined in the monitored zone by the radio location system, the control and evaluation unit sets the spatially resolving sensor into operation at a reduced safety level,
   and wherein a control and evaluation unit of the spatially resolving sensor is configured in operation at a reduced safety level to carry out fewer fault control measures.

14. The method of claim 13, wherein switching over of the different safety levels takes place by an operating mode switchover.

15. A safety system for localizing a person and/or an object in a monitored zone having a control and evaluation unit, having at least one radio location system for the position determination of the person and/or of the object in the monitored zone, having at least one spatially resolving sensor for the presence determination of the person and/or of the object in a protected field of the spatially resolving sensor, wherein the protected field is arranged within the monitored zone,
   wherein the radio location system has arranged radio stations,
   wherein at least one radio transponder is arranged at the person and/or the object;
   wherein position data of the person and/or the object can be determined by means of the radio location system,
   wherein the position data can be transmitted from the radio stations of the radio location system to the control and evaluation unit, and status information on the protected field can be determined by means of the spatially resolving sensor,
   wherein status information on the protected field can be transmitted from the spatially resolving sensor to the control and evaluation unit,
   wherein the control and evaluation unit is configured to evaluate the position data of the radio localization system and the status information of the spatially resolving sensor; and if a person and/or an object is/are determined in the monitored zone by the radio location system, the control and evaluation unit is configured to set the spatially resolving sensor into operation at a non-reduced safety level, and, if no person and/or no object is/are determined in the monitored zone by the radio location system, the control and evaluation unit is configured to set the spatially resolving sensor into operation at a reduced safety level,
   and wherein a first inspection unit is provided, with the first inspection unit being connected to the control and evaluation unit, and with the control and evaluation unit being checked by the first inspection unit.

16. A safety system for localizing a person and/or an object in a monitored zone having a control and evaluation unit, having at least one radio location system for the position determination of the person and/or of the object in the monitored zone, having at least one spatially resolving sensor for the presence determination of the person and/or of the object in a protected field of the spatially resolving sensor, wherein the protected field is arranged within the monitored zone,
   wherein the radio location system has arranged radio stations,
   wherein at least one radio transponder is arranged at the person and/or the object;
   wherein position data of the person and/or the object can be determined by means of the radio location system,
   wherein the position data can be transmitted from the radio stations of the radio location system to the control and evaluation unit, and status information on the protected field can be determined by means of the spatially resolving sensor,
   wherein status information on the protected field can be transmitted from the spatially resolving sensor to the control and evaluation unit,
   wherein the control and evaluation unit is configured to evaluate the position data of the radio localization system and the status information of the spatially resolving sensor; and if a person and/or an object is/are determined in the monitored zone by the radio location system, the control and evaluation unit is configured to set the spatially resolving sensor into operation at a non-reduced safety level, and, if no person and/or no object is/are determined in the monitored zone by the radio location system, the control and evaluation unit is configured to set the spatially resolving sensor into operation at a reduced safety level,
   and wherein a control and evaluation unit of the spatially resolving sensor is configured in operation at a reduced safety level to carry out an evaluation on the basis of a higher minimal remission of the object.

17. A method using a safety system for localizing a person and/or an object in a monitored zone having a control and evaluation unit, having at least one radio location system for the position determination of the person and/or object in the monitored zone, having at least one spatially resolving sensor for the presence determination of the person and/or the object in a protected field of the spatially resolving sensor, wherein the protected field is arranged within the monitored zone,
   wherein the radio location system has arranged radio stations,
   wherein at least one radio transponder is arranged at the person and/or the object,
   wherein position data of the person and/or the object are determined by means of the radio location system, wherein the position data are transmitted from the radio station of the radio location system to the control and evaluation unit, and status information on the protected field are determined by means of the spatially resolving sensor, wherein status information on the protected field are transmitted from the spatially resolving sensor to the control and evaluation unit, wherein the control and evaluation unit evaluates the position data of the radio localization system and the status information of the spatially resolving sensor; and, if a person and/or an object is/are determined in the monitored zone by the radio location system, the control and evaluation unit sets the spatially resolving sensor into operation at a non-reduced safety level, and, if no person and/or no object is/are determined in the monitored zone by the radio location system, the control and evaluation unit sets the spatially resolving sensor into operation at a reduced safety level.

18. A method using a safety system for localizing a person and/or an object in a monitored zone having a control and evaluation unit, having at least one radio location system for the position determination of the person and/or object in the monitored zone, having at least one spatially resolving sensor for the presence determination of the person and/or the object in a protected field of the spatially resolving sensor, wherein the protected field is arranged within the monitored zone, wherein the radio location system has arranged radio stations, wherein at least one radio transponder is arranged at the person and/or the object, wherein position data of the person and/or the object are determined by means of the radio location system, wherein the position data are transmitted from the radio station of the radio location system to the control and evaluation unit, and status information on the protected field are determined by means of the spatially resolving sensor, wherein status information on the protected field are transmitted from the spatially resolving sensor to the control and evaluation unit, wherein the control and evaluation unit evaluates the position data of the radio localization system and the status information of the spatially resolving sensor; and, if a person and/or an object is/are determined in the monitored zone by the radio location system, the control and evaluation unit sets the spatially resolving sensor into operation at a non-reduced safety level, and, if no person and/or no object is/are determined in the monitored zone by the radio location system, the control and evaluation unit sets the spatially resolving sensor into operation at a reduced safety level.

* * * * *